(12) United States Patent
Lang

(10) Patent No.: US 9,708,089 B2
(45) Date of Patent: Jul. 18, 2017

(54) SEPARATION SYSTEM AND METHOD FOR A PACKAGING FACILITY

(71) Applicant: Multivac Sepp Haggenmüller GmbH & Co. KG, Wolfertschwenden (DE)

(72) Inventor: Michael Lang, Buching (DE)

(73) Assignee: MULTIVAC SEPP HAGGENMUELLER SE & CO. KG, Wolfertschwenden (DE)

( * ) Notice: Subject to any disclaimer, the term of this patent is extended or adjusted under 35 U.S.C. 154(b) by 821 days.

(21) Appl. No.: 14/080,530

(22) Filed: Nov. 14, 2013

(65) Prior Publication Data

US 2014/0137510 A1 May 22, 2014

(30) Foreign Application Priority Data

Nov. 16, 2012 (EP) .................................. 12007770

(51) Int. Cl.
| | |
|---|---|
| *B65B 35/10* | (2006.01) |
| *B65B 35/24* | (2006.01) |
| *B65B 35/40* | (2006.01) |
| *B65B 57/14* | (2006.01) |
| B65G 47/31 | (2006.01) |
| B65B 9/04 | (2006.01) |
| B65G 47/08 | (2006.01) |

(52) U.S. Cl.
CPC .............. *B65B 35/10* (2013.01); *B65B 35/24* (2013.01); *B65B 35/40* (2013.01); *B65B 57/14* (2013.01); *B65B 9/04* (2013.01); *B65G 47/088* (2013.01); *B65G 47/31* (2013.01)

(58) Field of Classification Search
CPC ........... B65B 35/10; B65B 35/24; B65B 9/04; B65G 47/31
See application file for complete search history.

(56) References Cited

U.S. PATENT DOCUMENTS

| | | | | |
|---|---|---|---|---|
| 3,466,835 | A * | 9/1969 | Temple ................... | B65B 35/50 198/449 |
| 3,485,339 | A * | 12/1969 | Miller .................... | B65G 43/08 198/460.1 |
| 4,044,885 | A * | 8/1977 | Rose ...................... | B65B 23/14 198/418.1 |
| 4,887,414 | A * | 12/1989 | Arena ..................... | B65B 21/24 198/418.7 |

(Continued)

FOREIGN PATENT DOCUMENTS

| | | |
|---|---|---|
| EP | 1279950 A1 | 1/2003 |
| EP | 2345587 A1 | 7/2011 |

(Continued)

*Primary Examiner* — Andrew M Tecco
(74) *Attorney, Agent, or Firm* — Husch Blackwell LLP

(57) ABSTRACT

The invention relates to a packaging facility and a method for operating a packaging facility, comprising a multi-lane packaging machine, a multi-lane separation system, a first transfer device, a second transfer device and a group packaging unit, wherein the first transfer device is adapted to transfer a plurality of packages of each lane consecutively from the packaging machine onto a first conveyor belt of the separation system, wherein the distance of two consecutive packages is changed in order to individually inspect the packages in an inspection module and the separation system comprises at least two conveyor belts.

9 Claims, 1 Drawing Sheet

(56) References Cited

U.S. PATENT DOCUMENTS

| | | | | |
|---|---|---|---|---|
| 4,936,077 A * | 6/1990 | Langen | ................ | B65G 47/845 |
| | | | | 198/418.2 |
| 5,070,995 A * | 12/1991 | Schaffer | ................ | B65G 43/10 |
| | | | | 198/460.1 |
| 7,128,217 B2 * | 10/2006 | Henry | .................... | A21C 15/00 |
| | | | | 198/418.7 |
| 2011/0167760 A1 * | 7/2011 | Spix | ........................ | B65B 5/105 |
| | | | | 53/65 |

FOREIGN PATENT DOCUMENTS

| | | | |
|---|---|---|---|
| EP | 2500276 A1 | 9/2012 | |
| WO | 2006111142 A1 | 10/2006 | |

\* cited by examiner

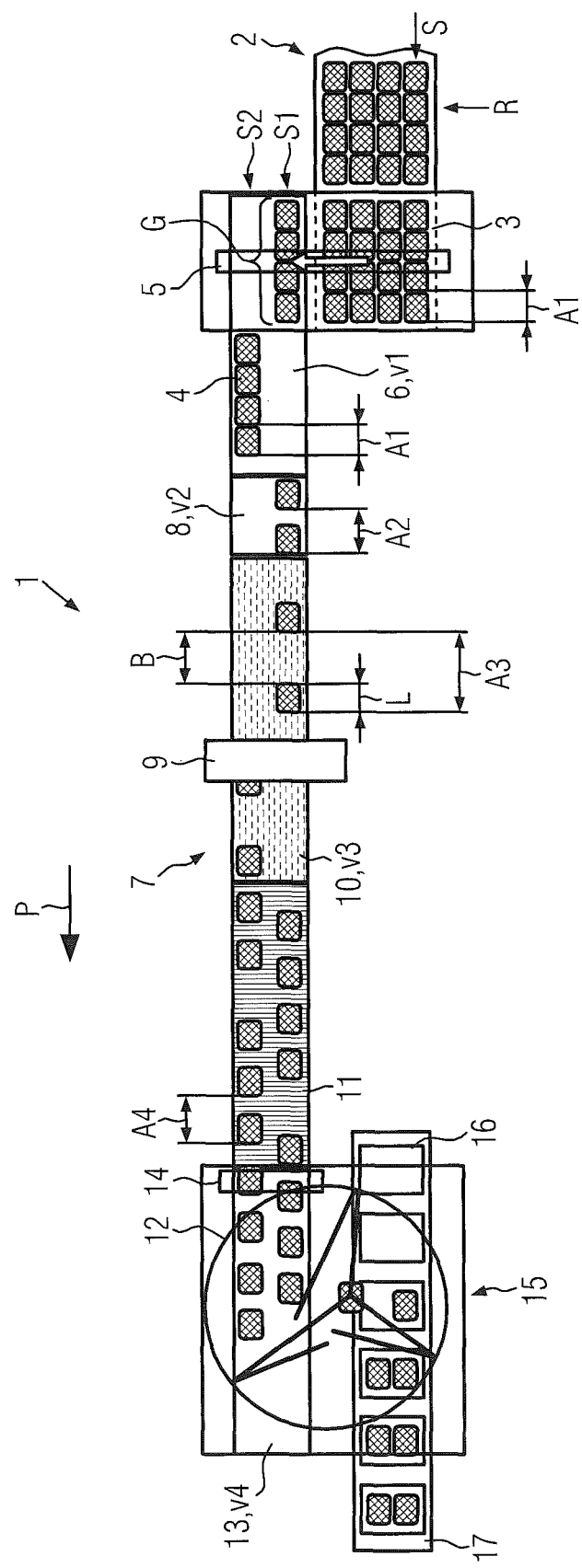

SEPARATION SYSTEM AND METHOD FOR A PACKAGING FACILITY

CROSS-REFERENCE TO RELATED APPLICATIONS

This Application claims priority to European Application Number 12007770.6 filed Nov. 16, 2012, to Michael Lang entitled "Separation System and Method for a Packaging Facility," currently pending, the entire disclosure of which is incorporated herein by reference.

FIELD OF THE INVENTION

The invention relates to a packaging facility and to a method for operating such a packaging facility.

BACKGROUND OF THE INVENTION

It is known in practice, that a device is provided downstream of a multi-lane intermittently operating thermoforming packaging machine, in order to separate a group of packages of one working cycle onto a single lane. To weigh packages individually or to inspect them in a metal detector, only one package may be located on the weighing belt or on the inspection lane, respectively. Therefore, the distance between packages typically immediately following each other in the direction of production must be increased. For this, multiple consecutively disposed conveyor belts can be provided, which each have an increased conveying speed. Each belt transfer increases the spacing between two consecutive packages. In order to transfer these packages after their inspection, for example, automatically into a group package, a respective number of robots are provided in order to be able to transfer the packages supplied at a high speed into the group packages. Due to the high conveying speeds of these packages, they can frequently only be transferred into a group package using several consecutively disposed robots. High speeds are also difficult for robots when taking up the packages from the conveyor belt and more time is required since synchronization of the gripper to the movement of the package requires more time.

SUMMARY OF THE INVENTION

The object of the present invention is to provide a possibility to reduce the number of robots necessary for transferring packages from a conveyor belt to a group package while maintaining high output of a packaging facility.

One embodiment of the packaging facility of the present invention comprises a multi-lane packaging machine, a multi-lane separation system, a first transfer device, a second transfer device and a group packaging unit where the first transfer device is adapted to consecutively transfer packages of the packaging machine lane-wise (i.e., lane by lane) with several packages per lane, from the packaging machine onto a conveyor belt of the separation system. The invention may be characterized in that the separation system is configured to change the distance in the direction of production between two consecutive packages, wherein the two consecutive packages can be transported on different lanes of double- or triple-lane conveyor belts of the separation system, and wherein the separation system comprises at least two conveyor belts. This makes it possible, firstly, to inspect individual packages by inspection systems and, secondly, to supply the packages in double or multi-lanes at a low speed to the second transfer device. The low speed ensures that the time for synchronizing the gripper of the second transfer device to the packages is minimized, and thereby to optimize output of the second transfer device, such that, depending on the output of the packaging machine, only a second transfer device may possibly be sufficient to place all packages, for example, into a group package.

The separation system can comprise at least one inspection module to individually inspect packages, wherein the inspection module can process a plurality of lanes of a conveyor belt. This simplifies the packaging facility and reduces the space requirements compared with a facility that is equipped with several single-lane inspection modules, and the complexity for lane separation and lane merging is reduced.

The inspection module may be a check weigher (i.e., a weighing device), a metal detector or an X-ray inspection unit that are commonly used in the food industry.

In one embodiment, the first transfer device is configured to simultaneously transfer a number of packages of one lane of the packaging machine as a group onto a first conveyor belt of the separation system.

At least a first and a second conveyor belt can be provided, wherein the second conveyor belt has a conveying speed that is greater than the conveying speed of the first conveyor belt by at least 30%, and in one embodiment by at least 50%, in order to increase a distance between two consecutive packages with only one belt transition.

In a further embodiment, the first transfer device is configured to consecutively transfer the packages, contained in a lane to be transferred, in a time-staggered manner onto a first conveyor belt of the separation system in order to increase the distance between two consecutive packages.

The packaging facility according to one embodiment of the invention is provided with a conveyor belt as an accumulation conveyor, which is given a lower conveying speed than the first conveyor belt, in order to reduce the distance between the consecutive packages on a lane. In this, the speed of the packages can be optimized for a transfer into a collection container using the second transfer device such that the output of the second transfer device is increased.

The second transfer device can be a robot and is intended to transfer packages from the separation system into the group packaging unit. Such robots are also known as pickers and can take up individual packages, which are previously recorded by a camera system or the position of which is known via a route control, with a gripper, for example, a vacuum sucker of the picker, from the conveyor and place them into a group package.

A method according to the present invention for operating a packaging facility, comprising a multi-lane packaging machine, a multi-lane separation system, a first transfer device, a second transfer device and a group packaging unit, where the first transfer device is adapted to transfer packages lane-wise consecutively with several packages per lane from the packaging machine onto a conveyor belt of the separation system, provides that the distance of two consecutive packages of a lane on the separation system is increased to the extent that inspection of individual packages can be performed using an inspection module of the separation system. The latter may be achieved in that a gap between consecutive packages is made equal or greater than the length of a single package.

The distance between the packages downstream of the inspection module may be reduced using a further conveyor belt, for example, an accumulation conveyor, in order to reach a package speed that is optimized for a robot to transfer the packages into a collection container.

In one embodiment, the packages are transferred from the separation system by at least the second transfer device, preferably only one robot, in the group packaging unit into a collection container, wherein the packages are supplied in multiple lanes, preferably in double lanes to the second transfer device. In this, the output of the second transfer device can be adjusted to the output of the packaging machine such that only a single second transfer device is necessary and the costs and space requirements of such a packaging facility can be reduced.

In one variant of the method according to the present invention, the first transfer device places the packages onto the first conveyor belt one at a time in order to increase the distance between two consecutive packages such that inspection of a single package can be performed in the inspection module.

In a further variant, the first transfer device places the packages together as a group onto the first conveyor belt and the distance between two consecutive packages is increased by using at least a second conveyor belt being operated at a higher conveying speed than the first conveyor belt, such that inspection of a single package in the inspection module can be performed.

The packages can be transferred from a multi-lane packaging machine to a double-lane separation system.

The packages may be transported in double lanes along the inspection module and the second transfer device, therefore only a single inspection module and a single transfer device are required, which saves space and costs.

It can be advantageous both for the packaging facility as well as for the method, if the first transfer device places the consecutively transferred lanes of packages alternately onto the two or more lanes of the first conveyor belt of the separation system. This ensures that a greater distance between consecutive packages is respectively created on every lane according to predetermined intervals.

Other and further objects of the invention, together with the features of novelty appurtenant thereto, will appear in the course of the following description.

DESCRIPTION OF THE VIEW OF THE DRAWING

In the following, an advantageous embodiment of the invention is further illustrated using a drawing. In detail:

FIG. 1 is a schematic plan view of a packaging facility according to one embodiment of the present invention.

DETAILED DESCRIPTION OF THE INVENTION

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a packaging facility 1 according to one embodiment of the invention with a direction of production P and a packaging machine 2 at the right edge of the drawing. The packaging machine 2 may comprise four lanes S in the direction of production P and may produce, within one working cycle, four rows R of packages 4 aligned transversely to the direction of production P. The packaging machine 2 can be an intermittently operating thermo-forming packaging machine and on its discharge conveyor 3 provide a format of four by four packages 4 for a first transfer device 5. The first transfer device 5 is embodied in FIG. 1 as a two-axis robot, consecutively receiving one lane S with four packages 4 each from the discharge belt 3 and passing them onto a first conveyor belt 6 of a separation system 7.

The first transfer device 5 may place the four packages 4 together as a group onto the first conveyor belt 6. The separation system 7 can be embodied in two lanes with a first lane S1 and a second lane S2. The packaging machine 2 operates, for example, at 10 cycles per minute and produces a total of 160 packages per minute with a format of four by four packages 4. The first transfer device 5 therefore has a time period of 5 to 6 seconds to respectively alternately transfer a group G of packages of the lanes S onto the two lanes S1 and S2 of the first conveyor belt 6 of the separation system 7 before the packaging machine 2 supplies the next format with 16 packages 4 on the discharge belt 3. The first conveyor belt 6 is therefore configured, for example, by its width, to adjacently transport two lanes S1, S2 of packages 4 side by side.

The first conveyor belt 6, for example, has a conveying speed v1 of 20 m/min, where groups G of packages 4 are arranged on the two lanes S1, S2 in the direction of production P offset and behind each other. In order to increase the distance A1 of two consecutive packages 4 of, for example, 200 mm—not shown to scale in FIG. 1—, a double-lane second conveyor belt 8 can be connected downstream of the first conveyor belt 6 and may have a larger conveying speed v2 of, for example, 30 m/min. The distance A2 in this example is now 300 mm, but still not sufficient for having the packages 4 be individually inspected by an inspection module 9, since a gap B between two consecutive packages 4 is to be greater than the packing length L of a package 4.

In the example shown, the inspection module 9 comprises a double-lane third conveyor belt 10 being operated at a larger speed v3 of, for example, 45 m/min. This has the consequence that the distance L+B=A3 of one package 4 to the next package 4 after the belt transition is at about 450 mm, and the packages 4 can be individually inspected by the inspection module 9. The distance A3 also pertains to a last package 4 of a lane S1 in relation to the first package 4 of another lane S2.

The inspection module 9 can be a metal detector or an X-ray inspection device for inspecting the package 4 for any metal residues and other foreign matter. The inspection module 9 can also be a check weigher determining the weight of the individual packages 4. It is also common to dispose a metal detector and a check weigher consecutively, for example when the products in the packages 4 are foods.

Downstream of the inspection module 9, a further conveyor belt is disposed as an accumulation conveyor 11 in order to again reduce the distance A4 between packages 4 being adjacent in the direction of production P. The accumulation conveyor 11 can be embodied as a conveyor belt with a conveying speed v4, for example, of 18 m/min or as a roller track.

In order to inspect packages 4 and to convey them at a constant speed to the receiving area of a second transfer device 12, the packages 4 are passed from the accumulation conveyor 11 onto a further conveyor belt 13. A camera 14 may determine the position of the packages 4 for both lanes S1, S2 and transmit it to a control unit—not shown—of the second transfer device 12, which is part of the group packaging unit 15. The second transfer device 12 is preferably embodied as a robot, for example, as a 4-axis Delta robot which picks up the packages 4 consecutively from both lanes S1 and S2 of the conveyor belt 13 and places them in a collection container 16. The collection containers 16 can be supplied to the group packaging unit 15 on a conveyor belt 17 disposed parallel to the separation unit 7 and are after the filling process supplied from the group packaging unit 15 to a next production step.

The second transfer device 12 may have an output corresponding at least to the output of the packaging machine 2, (i.e. at least 160 packages per minute, for example) preferably 180 packages per minute, to also be able to safely compensate variations in the output of the packaging machine 2 or the separation unit 7 in order to maximize the output of the entire packaging facility 1.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A packaging facility comprising:
    a direction of production;
    a multi-lane packaging machine for producing a plurality packages in a plurality of lanes during a working cycle, wherein each one of the plurality of lanes includes two or more of said plurality of packages;
    a multi-lane separation system downstream of the multi-lane packaging machine in the direction of production, the multi-lane separation system including at least two conveyor belts, wherein each said conveyor belt includes two or more lanes;
    a first transfer device;
    a second transfer device downstream of the first transfer device; and
    a group packaging unit downstream of the multi-lane separation system in the production direction;
    wherein said first transfer device consecutively transfers packages lane by lane from said packaging machine onto a first of said at least two conveyor belts of said separation system, each lane of said packages produced in said packaging machine being transferred into one of the two or more lanes of said first conveyor belt;
    wherein said separation system increases a distance between two consecutive packages in the direction of production one-after-the-other in one of a same lane or a different lane of at least one of said at least two conveyor belts.

2. The packaging facility according to claim 1, wherein said separation system comprises at least one inspection module disposed downstream of said packaging machine to individually inspect packages, and wherein said inspection module can inspect packages on a plurality of said lanes of one of said at least two conveyor belts.

3. The packaging facility according to claim 2, wherein said inspection module is at least one of a check weigher, a metal detector, and an X-ray inspection unit.

4. The packaging facility according to claim 1, wherein said first transfer device transfers said packages contained in a lane of said packaging machine together as a group onto said first said conveyor belt.

5. The packaging machine according to claim 1, wherein said second conveyor belt has a conveying speed being greater than a conveying speed of said first conveyor belt.

6. The packaging facility according to claim 5, wherein at least a third conveyor belt is provided as an accumulation conveyor, said third conveyor belt having a conveying speed that is less than at least one of said first conveyor belt or said second conveyor belt, in order to reduce the distance between said consecutive packages in a lane.

7. The packaging facility according to claim 1, wherein said first transfer device transfers said packages contained in a lane of said packaging machine individually and consecutively onto said first conveyor belt.

8. The packaging facility according to claim 1, wherein said first transfer device transfers lanes of said plurality of packages to be transferred alternatingly onto into the two or more lanes of said first conveyor belt.

9. The packaging facility according to claim 1, wherein said first transfer device transfers said plurality of packages from said packaging machine onto said first conveyor belt in a direction substantially perpendicular to said production direction.

* * * * *